United States Patent
Zhao et al.

(10) Patent No.: US 10,371,116 B2
(45) Date of Patent: Aug. 6, 2019

(54) METHOD AND APPARATUS FOR CONTROLLING A MULTI-CYLINDER INTERNAL COMBUSTION ENGINE

(71) Applicant: GM GLOBAL TECHNOLOGY OPERATIONS LLC, Detroit, MI (US)

(72) Inventors: Junfeng Zhao, Troy, MI (US); Jun-mo Kang, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 80 days.

(21) Appl. No.: 15/836,183

(22) Filed: Dec. 8, 2017

(65) Prior Publication Data

US 2019/0178223 A1   Jun. 13, 2019

(51) Int. Cl.
  *F02P 5/153* (2006.01)
  *F02P 5/04* (2006.01)
  *F02D 35/02* (2006.01)

(52) U.S. Cl.
  CPC ............ *F02P 5/153* (2013.01); *F02D 35/023* (2013.01); *F02P 5/045* (2013.01)

(58) Field of Classification Search
  CPC .......... F02P 5/153; F02P 5/045; F02D 35/023
  USPC .............. 123/406.18, 406.2, 406.22, 406.41, 123/406.58; 73/35.12, 114.16
  See application file for complete search history.

(56) References Cited

U.S. PATENT DOCUMENTS 7,461,545 B2 * 12/2008 Gardiner ............. G01M 15/048
                                                73/114.02
7,761,223 B2 *  7/2010 Wang .................... F02D 35/023
                                                701/114

* cited by examiner

*Primary Examiner* — Hai H Huynh
(74) *Attorney, Agent, or Firm* — Quinn IP Law

(57) ABSTRACT

A multi-cylinder spark-ignition internal combustion engine includes a monitored cylinder and a plurality of non-monitored cylinders, a pressure sensor disposed to monitor in-cylinder pressure in the monitored cylinder and a rotational position sensor. The controller is in communication with the pressure sensor, the rotational position sensor and the spark controller. The controller monitors, via the pressure sensor, in-cylinder pressure for the monitored cylinder during a combustion event, and determines a first spark timing based upon a desired spark timing and the in-cylinder pressure. A spark controller controls spark timing for the monitored cylinder based upon the final spark timing. The controller monitors, via the rotational position sensor, engine rotational speed and crankshaft speed pulsations associated with the monitored cylinder and the non-monitored cylinders, and determines a modal coefficient for the non-monitored cylinders based upon the engine rotational speed and the crankshaft speed pulsations.

17 Claims, 4 Drawing Sheets

METHOD AND APPARATUS FOR CONTROLLING A MULTI-CYLINDER INTERNAL COMBUSTION ENGINE

INTRODUCTION

Operation of an internal combustion engine benefits from balancing combustion between the cylinders.

SUMMARY

A multi-cylinder spark-ignition internal combustion engine is described, and includes a monitored cylinder and a plurality of non-monitored cylinders, a plurality of pistons disposed in the monitored cylinder and the non-monitored cylinders and coupled to a crankshaft, a pressure sensor disposed to monitor in-cylinder pressure in the monitored cylinder, a rotational position sensor disposed to monitor rotational position of the crankshaft, a spark ignition system including a spark controller in communication with a plurality of spark igniters that are disposed in the monitored cylinder and the plurality of non-monitored cylinders, and a controller. The controller is in communication with the pressure sensor, the rotational position sensor and the spark controller. The controller includes an instruction set that is executable to monitor, via the pressure sensor, in-cylinder pressure for the monitored cylinder during a combustion event for the monitored cylinder, and determine a first spark timing for the monitored cylinder based upon a desired spark timing and the in-cylinder pressure. The spark controller is disposed to control spark timing for the monitored cylinder based upon the final spark timing. The controller monitors, via the rotational position sensor, engine rotational speed and crankshaft speed pulsations associated with the monitored cylinder and the non-monitored cylinders, and determines a modal coefficient for the non-monitored cylinders based upon the engine rotational speed and the crankshaft speed pulsations.

An aspect of the disclosure includes executing a principal component analysis to determine the modal coefficient for the non-monitored cylinders based upon the engine rotational speed and the crankshaft speed pulsations.

Another aspect of the disclosure includes monitoring, via the pressure sensor, in-cylinder pressure for the monitored cylinder during a combustion event for the monitored cylinder and determining a combustion parameter for the combustion event for the monitored cylinder based upon the in-cylinder pressure.

Another aspect of the disclosure includes determining a combustion parameter for the combustion event for the monitored cylinder based upon the in-cylinder pressure, determining a first error term based upon the combustion parameter and a desired state for the combustion parameter, determining a control point for the combustion parameter based upon the first error term, determining the desired spark timing for the monitored cylinder based upon an engine operating point, and determining the final spark timing for the monitored cylinder based upon the desired spark timing and the control point for the combustion parameter.

Another aspect of the disclosure includes determining a combustion parameter, which includes determining a crank angle associated with a parameter associated with a mass-burn-fraction point for the cylinder charge.

Another aspect of the disclosure includes the parameter associated with the mass-burn-fraction point for the cylinder charge being a crank angle associated with a 50% mass-burn-fraction point for the cylinder charge.

Another aspect of the disclosure includes a method for controlling a multi-cylinder spark-ignition internal combustion engine that includes a monitored cylinder and a plurality of non-monitored cylinders, wherein a pressure sensor is disposed to monitor in-cylinder pressure in the monitored cylinder.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

It should be understood that the appended drawings are not necessarily to scale, and present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure.

Figure 1:
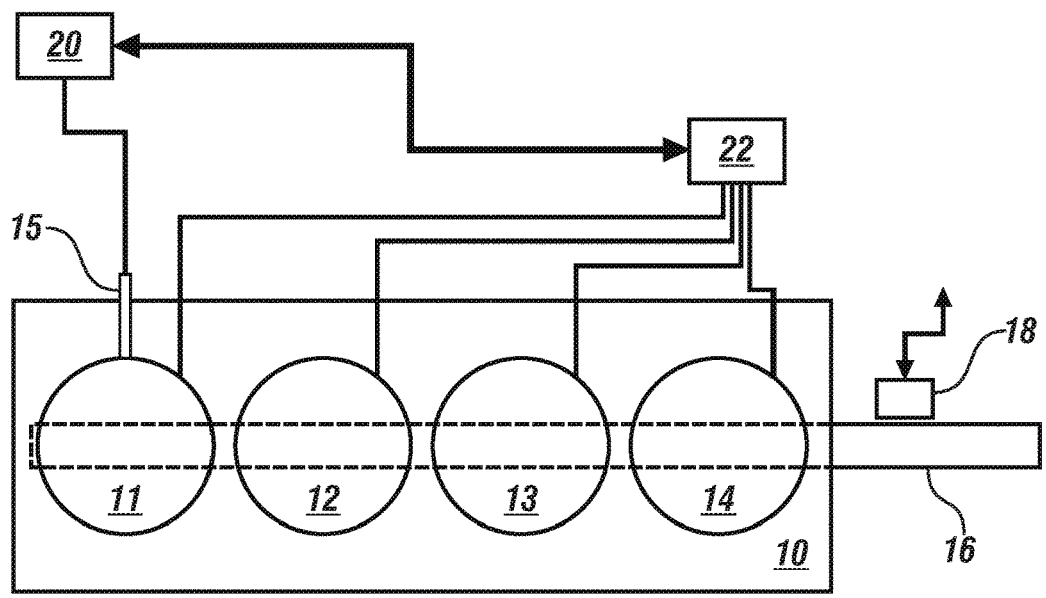
FIG. 1 schematically illustrates a multi-cylinder direct fuel injection, spark-ignition internal combustion engine and associated engine controller, in accordance with the disclosure.

Referring to the drawings, wherein like reference numerals correspond to like or similar components throughout the several Figures, FIG. 1, consistent with embodiments disclosed herein, schematically illustrates a multi-cylinder direct fuel injection, spark ignition internal combustion engine (engine) 10 and associated engine controller 20 that may be disposed in a vehicle to provide propulsion power. The vehicle may include, but not be limited to a mobile platform in the form of a commercial vehicle, industrial vehicle, agricultural vehicle, passenger vehicle, aircraft, watercraft, train, all-terrain vehicle, personal movement apparatus, robot and the like to accomplish the purposes of this disclosure.

The engine 10 includes a plurality of cylinders, including cylinder 1 11, cylinder 2 12, cylinder 3 13 and cylinder 4 14. The engine 10 is arranged in an in-line configuration as shown, but may be configured in a V-configuration, a W-configuration or another configuration within the scope of this disclosure. Each of the cylinders 11, 12, 13 and 14 includes an in-cylinder fuel injector that is disposed to inject fuel into a respective combustion chamber. The injected fuel is combined with intake air and recirculated exhaust gas to form a cylinder charge. Each of the cylinders 11, 12, 13 and 14 includes an in-cylinder spark igniter that is electrically connected to a spark controller 22, and disposed to ignite the respective cylinder charge. Each of the cylinders 11, 12, 13 and 14 has a piston slidably disposed therein, wherein the piston is coupled via a connecting rod to a rotatable crankshaft 16. Rotational position and hence rotational speed of the crankshaft 16 is monitored by a rotational position sensor 18. The rotational position sensor 18 may be an encoder device, e.g., a Hall effect sensor that generates a signal for an increment of rotation of the crankshaft 16. In one embodiment, the encoder signal is associated with six degrees of rotation of the crankshaft 16.

A pressure sensor 15 is disposed to dynamically monitor in-cylinder pressure that is generated in one of the cylinders, i.e., cylinder 1 11, during each combustion event as a result of ignition of the cylinder charge, and is referred herein as a "monitored cylinder". In-cylinder pressure of the other cylinders, e.g., cylinders 12, 13 and 14 is not monitored, and these other cylinders are referred to herein as "non-monitored cylinders". The spark controller 22, the rotational position sensor 18 and the pressure sensor 15 communicate with the controller 20.

The term "controller" and related terms such as control module, module, control, control unit, processor and similar terms refer to one or various combinations of Application Specific Integrated Circuit(s) (ASIC), electronic circuit(s), central processing unit(s), e.g., microprocessor(s) and associated non-transitory memory component(s) in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean controller-executable instruction sets including calibrations and look-up tables. Each controller executes control routine(s) to provide desired functions. Routines may be executed at regular intervals, for example each 100 microseconds during ongoing operation. Alternatively, routines may be executed in response to occurrence of a triggering event. Communication between controllers, and communication between controllers, actuators and/or sensors may be accomplished using a direct wired point-to-point link, a networked communication bus link, a wireless link or another suitable communication link. Communication includes exchanging data signals in suitable form, including, for example, electrical signals via a conductive medium, electromagnetic signals via air, optical signals via optical waveguides, and the like. The data signals may include discrete, analog or digitized analog signals representing inputs from sensors, actuator commands, and communication between controllers. The term "signal" refers to a physically discernible indicator that conveys information, and may be a suitable waveform (e.g., electrical, optical, magnetic, mechanical or electromagnetic), such as DC, AC, sinusoidal-wave, triangular-wave, square-wave, vibration, and the like, that is capable of traveling through a medium.

The term 'model' refers to a processor-based or processor-executable code and associated calibration that simulates a physical existence of a device or a physical process. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine. The terms "calibration", "calibrate", and related terms refer to a result or a process that compares an actual or standard measurement associated with a device with a perceived or observed measurement or a commanded position. A calibration as described herein can be reduced to a storable parametric table, a plurality of executable equations or another suitable form.

A parameter is defined as a measurable quantity that represents a physical property of a device or other element that is discernible using one or more sensors and/or a physical model. A parameter can have a discrete value, e.g., either "1" or "0", or can be infinitely variable in value.

Figure 2:
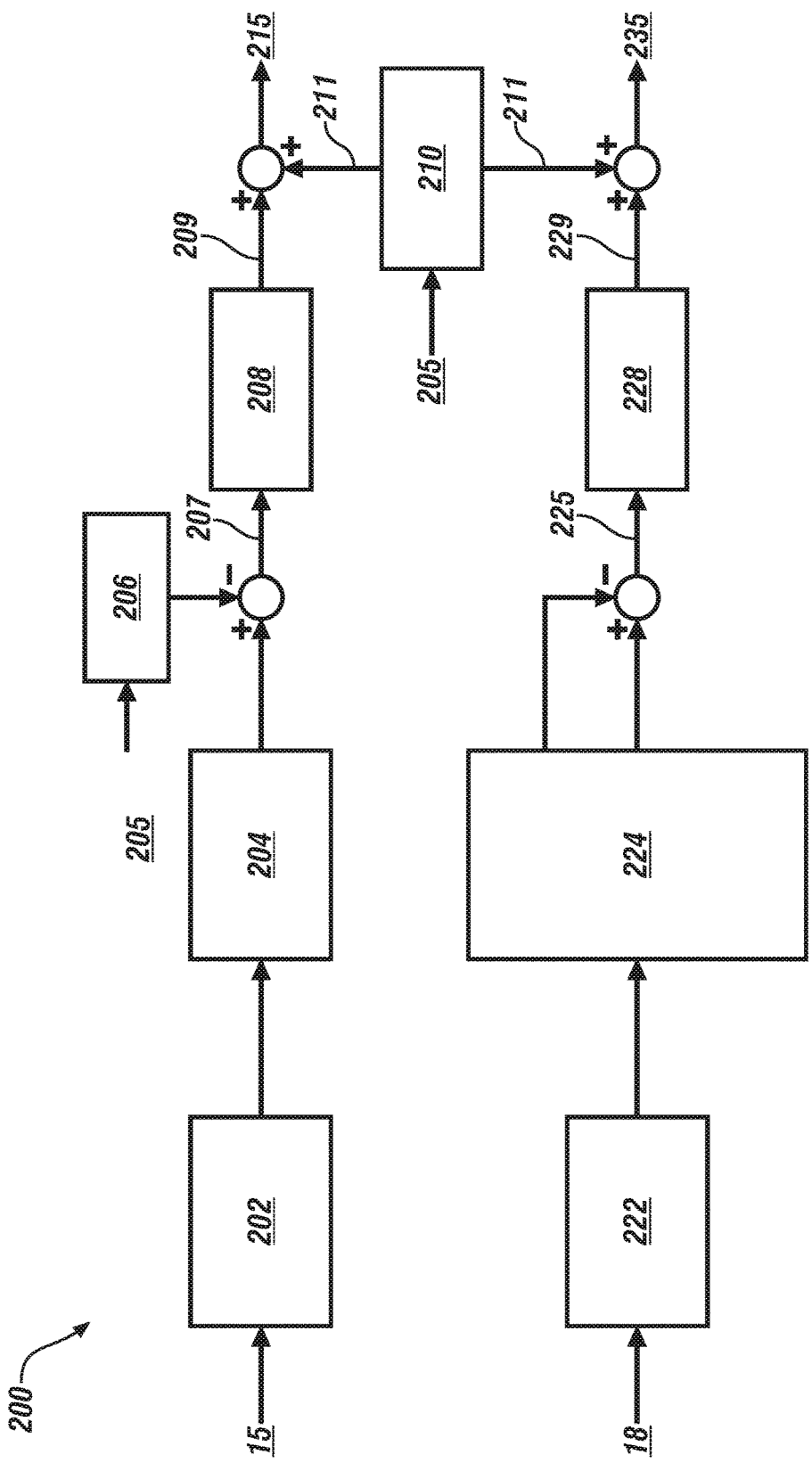
FIG. 2 schematically shows a spark control routine for controlling spark timing in an embodiment of the multi-cylinder spark-ignition internal combustion engine that is described with reference to FIG. 1, wherein combustion is monitored via a single in-cylinder pressure sensor and a crankshaft rotational position sensor, in accordance with the disclosure.

FIG. 2 schematically shows a control routine 200 for controlling spark timing in an embodiment of the multi-cylinder spark-ignition internal combustion engine 10 described with reference to FIG. 1, which includes a single monitored cylinder, e.g., cylinder 11 and a plurality of non-monitored cylinders, e.g., cylinders 12, 13 and 14, wherein combustion is monitored via the in-cylinder pressure sensor 15 and the rotational position sensor 18. The control routine 200 includes monitoring, via the pressure sensor 15, in-cylinder pressure during a combustion event for the monitored cylinder (202). The pressure sampling rate occurs at a relatively high sampling rate, e.g., once each degree of rotation of the crankshaft 16. The in-cylinder pressure indicates combustion heat release during combustion of a cylinder charge, and thus may be analyzed to determine mass-burn-fraction points for the combustion event (204). An actual mass-burn-fraction point can be an actual CA50 point, which represents a crank angle at which 50% of the mass-burn-fraction of the cylinder charge has been achieved in the single monitored cylinder, e.g., cylinder 11. The CA50 point is a non-limiting example of a combustion parameter that may be dynamically determined during engine operation. The concepts are described herein with reference to a state of a combustion parameter in the form of the CA50 point. It is appreciated that other combustion parameters may be employed within the scope of the disclosure.

Engine operating conditions and desired engine power output are concurrently monitored to determine an engine operating point 205, and a desired CA50 point for the single monitored cylinder, e.g., cylinder 11 may be determined based thereon (206). The engine operating point 205 preferably includes states of parameters including engine speed, engine load and similar parameters. A CA50 error 207 can be determined, and is a difference between the actual CA50 point and the desired CA50 point in one embodiment. The CA50 error term 207 is employed in a control routine 208 to determine a first spark timing command 209 based thereon. Simultaneously, the engine operating point 205 is employed in an engine spark calibration routine (210) to determine a desired spark timing 211 for operating the engine 10 in response. The engine spark calibration routine (210) may be composed of a calibration array that is stored in a memory device and includes a spark timing point for the engine operating point 205 that achieves a minimum brake-specific fuel consumption. The desired spark timing 211 and the spark timing command 209 are arithmetically combined to determine a final spark timing command for the single monitored cylinder 215, e.g., cylinder 11, which is communicated to the spark controller 22 for implementation during the next engine cycle.

Figure 3:
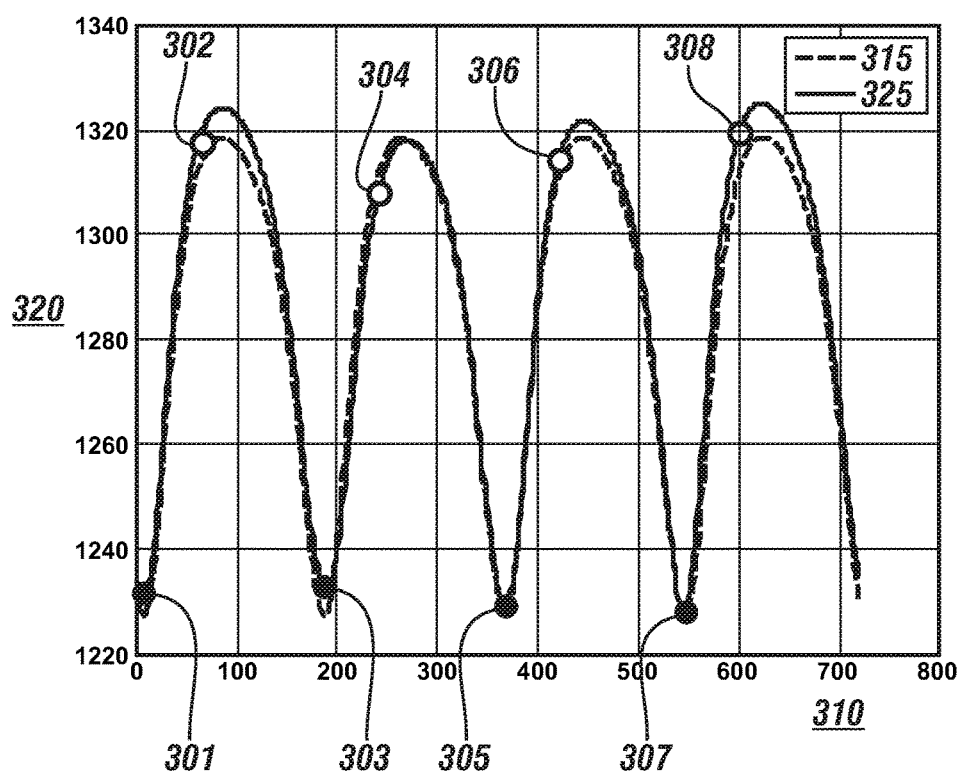
FIG. 3 graphically illustrates crankshaft speed in relation to engine crank angle over 720 degrees of crankshaft rotation, with magnitude of crankshaft speed indicated in relation to crankshaft rotational position that is associated with operation of an embodiment of the engine that is described with reference to FIG. 1, in accordance with the disclosure.

Coincidentally, the rotational position sensor 18 monitors rotational position and hence rotational speed of the crankshaft 16, which is sampled at a relatively low frequency, e.g., every 6 degrees of rotation of the crankshaft 16 (222), with crankshaft speed pulsations being generated and input to an analysis routine (224). Example data is shown with reference to FIG. 3, which graphically illustrates crankshaft speed in relation to engine crank angle over 720 degrees of crankshaft rotation, i.e., a single engine cycle, and is described with continued reference to the internal combustion engine 10. Magnitude of crankshaft speed is indicated on the vertical axis 320 and crankshaft rotational position is indicated on the horizontal axis 310. Plotted data includes crankshaft speed for engine operation having unbalanced cylinders 315 and crankshaft speed for engine operation with balanced cylinders 325. Points associated with the crankshaft speed associated with engine operation having unbalanced cylinders 315 include a crankshaft speed measured at start of combustion in cylinder 1 11 301, a crankshaft speed measured at end of combustion in cylinder 1 11 302, a crankshaft speed measured at start of combustion in cylinder 2 12 303, a crankshaft speed measured at end of combustion in cylinder 2 12 304, a crankshaft speed measured at start of combustion in cylinder 3 13 305, a crankshaft speed measured at end of combustion in cylinder 3 13 306, and a crankshaft speed measured at start of combustion in cylinder 4 14 307 and a crankshaft speed measured at end of combustion in cylinder 4 14 308.

The analysis routine (224) employs principal component analysis (PCA) techniques to determine coefficients (PCM-1 coefficients) associated with each of the cylinders based upon the crankshaft speed and inter-cylinder variations in the crankshaft speed. PCA is a mathematical procedure that transforms a plurality of potentially correlated variables into a fewer quantity of uncorrelated variables that are referred to as principal components. The PCA technique includes initially determining crankshaft speed deviations for individual cylinders in relation to an average crankshaft speed over an engine cycle. This is shown graphically with reference to FIG. 4, which includes a magnitude of delta crankshaft speed 420 on the vertical axis in relation to engine crank angle 410, which is indicated on the horizontal axis for an embodiment of the engine 10 that is described with reference to FIG. 1. Delta crankshaft speeds for the individual cylinders include a first delta speed 411 associated with cylinder 1 11, a second delta speed 412 associated with cylinder 2 12, a third delta speed 413 associated with cylinder 3 13 and a fourth delta speed 414 associated with cylinder 4 14.

Figure 4:
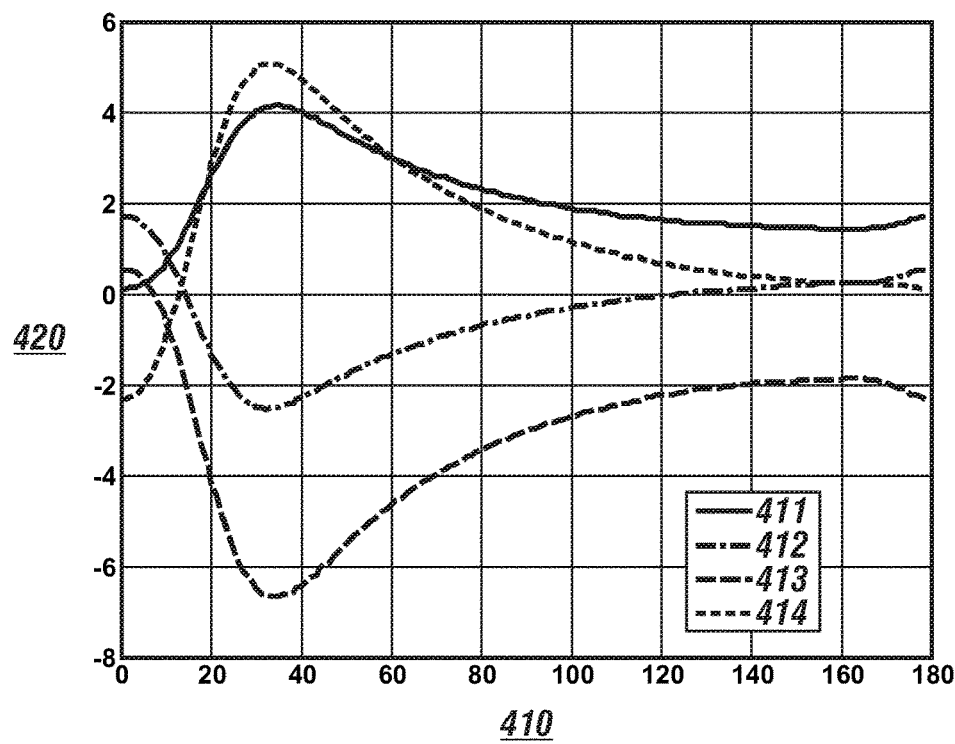
FIG. 4 graphically illustrates a magnitude of delta crankshaft speed in relation to engine crank angle that is associated with operation of an embodiment of the engine that is described with reference to FIG. 1, in accordance with the disclosure.
Figure 5:
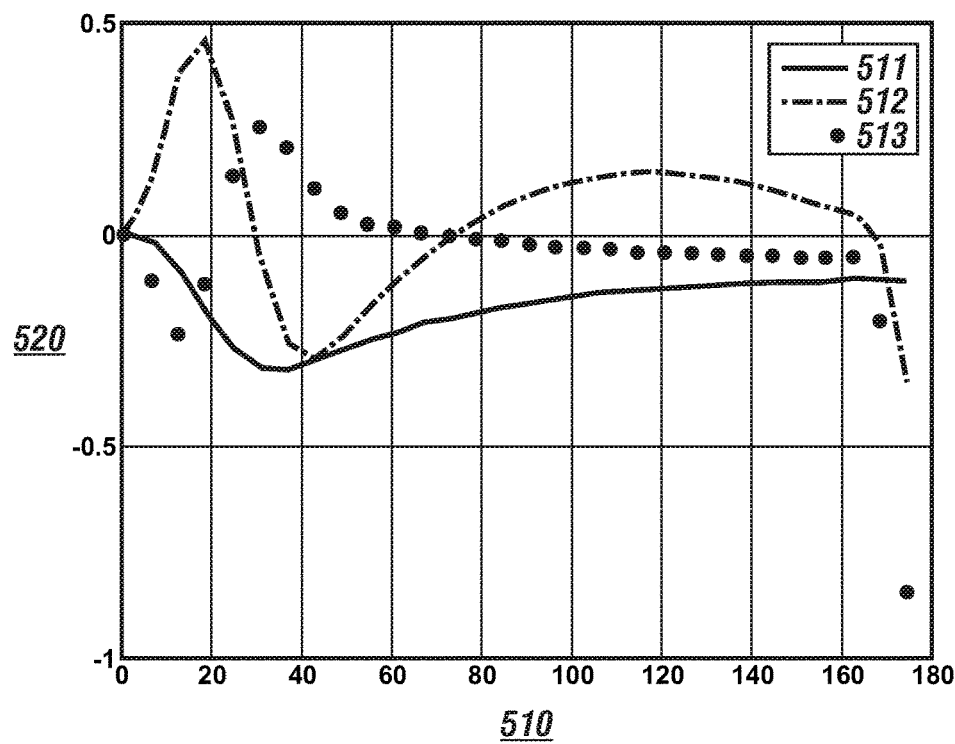
FIG. 5 graphically illustrates a plurality of principal component vectors based upon the delta crankshaft speeds for the individual cylinders in relation to engine crank angle, in accordance with the disclosure.

The analysis routine (224) executes the PCA to determine principal component vectors based upon the delta crankshaft speeds for the individual cylinders as shown with reference to FIG. 4. This is shown graphically with reference to FIG. 5, which includes modal vectors 520 on the vertical axis in relation to engine crank angle 510. The principal component vectors PCM1 511, PCM2 512 and PCM3 513 are associated with the non-monitored cylinders, e.g., cylinders 12, 13 and 14, and represent factors associated with individual torque variations from the single monitored cylinder, e.g., cylinder 11.

Figure 6:
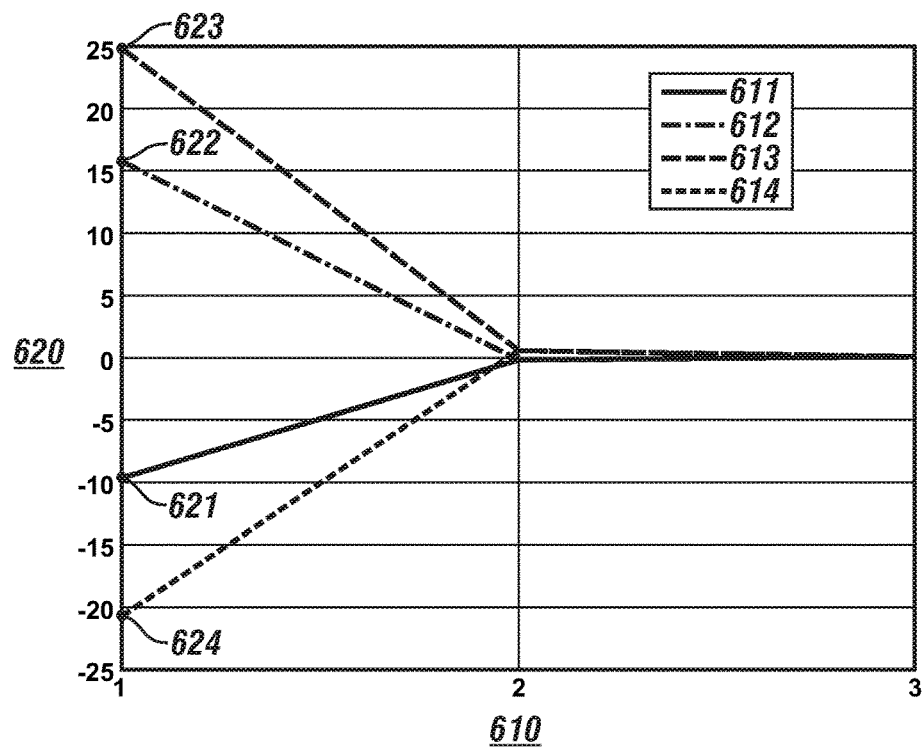
FIG. 6 graphically illustrates target modal principal component (PC-1) coefficients for the monitored cylinder and the non-monitored cylinders based upon the magnitude of the principal component vectors, in accordance with the disclosure.

The principal component vectors PCM1 511, PCM2 512 and PCM3 513 can be employed to determine target modal principal component (PC-1) coefficients for the monitored cylinder and the non-monitored cylinders based upon the magnitude of the modal vector. Examples of the target PC-1 coefficients are shown with reference to FIG. 6, which graphically indicates magnitude of the PC-1 coefficients 620 on the vertical axis, in relation to the modal number 610 on the horizontal axis, including a first target PC-1 coefficient 611 for the monitored cylinder and target PC-1 coefficients 612, 613 and 614, respectively, for the respective non-monitored cylinders. Initial values for the target PC-1 coefficients include a first initial value 621 for the first target PC-1 coefficient 611 for the monitored cylinder and initial values 622, 623 and 624, respectively, for the target PC-1 coefficients 612, 613 and 614 for the respective non-monitored cylinders. Error terms for the PC-1 coefficients are determined for each of the non-monitored cylinders in comparison with the PC-1 coefficient for the monitored cylinder (225).

The error terms for the PC-1 coefficients are employed in a balance routine 228, which determines a corrected CA50 point for each of the non-monitored cylinders based upon the associated error term for the respective PC-1 coefficient.

Figure 7:
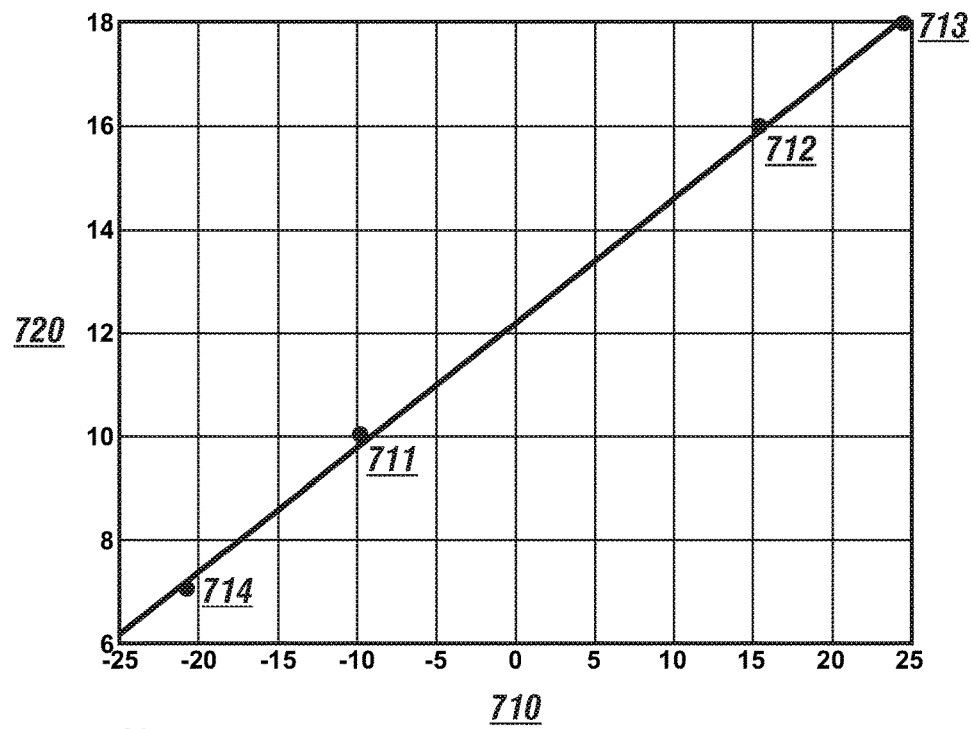
FIG. 7 graphically illustrates a relationship between target modal principal component (PC-1) coefficients in relation to a corrected combustion parameter state for each of the cylinders, in accordance with the disclosure.

FIG. 7 graphically depicts a relation employed in the balance routine 228, including a corrected CA50 point in relation to a magnitude of a PC-1 coefficient, with magnitude of CA50 point 720 shown on the vertical axis in relation to magnitude of the PC-1 coefficient 710, which is shown on the horizontal axis. Plotted values include a corrected CA50 point for each of the cylinders, including a corrected CA50 point 711 for the monitored cylinder and corrected CA50 points 712, 713 and 714, respectively, for the non-monitored cylinders. The corrected CA50 point 711 for the monitored cylinder and corrected CA50 points 712, 713 and 714, respectively, for the non-monitored cylinders form a straight line which can be reduced to an algorithm and integrated into the balance routine 228.

The corrected CA50 point 711 for the monitored cylinder and corrected CA50 points 712, 713 and 714, respectively, for the non-monitored cylinders are provided as input to a control routine. The control routine determines spark timing adjustments 229 for the non-monitored cylinders based upon the corrected CA50 point 711 and the respective corrected CA50 points 712, 713 and 714. The respective spark timing adjustments 228 are arithmetically combined with the desired spark timing 211 to determine respective final spark timing commands 235 for the non-monitored cylinders, e.g., cylinders 12, 13 and 14, which are communicated to the spark controller 22 for implementation during the next engine cycle.

By utilizing one cylinder pressure sensor measurement, the CA50 point of the monitored cylinder can be controlled to the desired value, and spark timing for each of the cylinders can be balanced based upon the rotational speed and the desired CA50 point that is determined based upon the engine operating point 205. This approach can reduce the quantity of combustion pressure sensors to a single sensor and also reduce computational load.

The flowchart and block diagrams in the flow diagrams illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose-hardware-based systems that perform the specified functions or acts, or combinations of special-purpose hardware and computer instructions. These computer program instructions may also be stored in a computer-readable medium that can direct a controller or other programmable data processing apparatus to function in a particular manner, such that the instructions stored in the computer-readable medium produce an article of manufacture including instructions to implement the function/act specified in the flowchart and/or block diagram block or blocks.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A method for controlling a multi-cylinder spark-ignition internal combustion engine that includes a monitored cylinder and a plurality of non-monitored cylinders, wherein an in-cylinder pressure sensor is disposed in the monitored cylinder, the method comprising:
    monitoring, via the pressure sensor, in-cylinder pressure for the monitored cylinder during a combustion event for the monitored cylinder;
    determining a first spark timing for the monitored cylinder based upon a desired spark timing and the in-cylinder pressure;
    controlling spark timing for the monitored cylinder based upon the first spark timing;
    monitoring, via a rotational position sensor, engine rotational speed and crankshaft speed pulsations associated with the monitored cylinder and the non-monitored cylinders;
    determining a modal coefficient for the non-monitored cylinders based upon the engine rotational speed and the crankshaft speed pulsations;
    determining coefficient errors for the non-monitored cylinders based upon the modal coefficients;
    executing a balance control to determine a spark timing adjustment for each of the non-monitored cylinders based upon the coefficient error;
    determining final spark timings for the non-monitored cylinders based upon the desired spark timing and the respective spark timing adjustment; and
    controlling spark timing for each of the non-monitored cylinders based upon the respective final spark timing.

2. The method of claim 1, comprising executing a principal component analysis to determine the modal coefficient for the non-monitored cylinders based upon the engine rotational speed and the crankshaft speed pulsations.

3. The method of claim 1, further comprising determining a combustion parameter for the combustion event for the monitored cylinder based upon the in-cylinder pressure.

4. The method of claim 3, wherein determining the first spark timing for the monitored cylinder based upon the desired spark timing and the in-cylinder pressure comprises:
    determining a first error term based upon the combustion parameter and a desired state for the combustion parameter;
    determining a control point for the combustion parameter based upon the first error term;
    determining the desired spark timing for the monitored cylinder based upon an engine operating point; and
    determining the first spark timing for the monitored cylinder based upon the desired spark timing and the control point for the combustion parameter.

5. The method of claim 3, wherein determining the combustion parameter for the combustion event for the monitored cylinder comprises determining a crank angle associated with a parameter associated with a mass-burn-fraction point for a cylinder charge.

6. The method of claim 5, wherein the parameter associated with the mass-burn-fraction point for the cylinder charge comprises a crank angle associated with a 50% mass-burn-fraction point for the cylinder charge.

7. A method for controlling a multi-cylinder spark-ignition internal combustion engine that includes a monitored cylinder and a plurality of non-monitored cylinders, wherein a pressure sensor is disposed to monitor in-cylinder pressure in the monitored cylinder, the method comprising:
    monitoring, via the pressure sensor, in-cylinder pressure for the monitored cylinder during a combustion event for the monitored cylinder;
    determining a first spark timing for the monitored cylinder based upon a desired spark timing and the in-cylinder pressure;
    controlling spark timing for the monitored cylinder based upon the first spark timing;
    monitoring, via a rotational position sensor, engine rotational speed and crankshaft speed pulsations associated with the monitored cylinder and the non-monitored cylinders;
    determining modal coefficients for the non-monitored cylinders based upon the engine rotational speed and the crankshaft speed pulsations;

determining coefficient errors for the non-monitored cylinders based upon the modal coefficients;
executing a balance control to determine a spark timing adjustment for each of the non-monitored cylinders based upon the respective coefficient error;
determining a final spark timing for each of the non-monitored cylinders based upon the desired spark timing and the respective spark timing adjustment; and
controlling spark timing for each of the non-monitored cylinders based upon the respective final spark timing.

8. The method of claim 7, comprising executing a principal component analysis to determine the modal coefficients for the non-monitored cylinders based upon the engine rotational speed and the crankshaft speed pulsations.

9. The method of claim 7, wherein determining the final spark timing for the monitored cylinder based upon the desired spark timing and the in-cylinder pressure comprises:
determining a combustion parameter for the combustion event for the monitored cylinder based upon the in-cylinder pressure;
determining a first error term based upon the combustion parameter and a desired state for the combustion parameter;
determining a control point for the combustion parameter based upon the first error term;
determining the desired spark timing for the monitored cylinder based upon an engine operating point; and
determining the final spark timing for the monitored cylinder based upon the desired spark timing and the control point for the combustion parameter.

10. The method of claim 7, wherein determining a combustion parameter comprises determining a crank angle associated with a parameter associated with a mass-burn-fraction point for the cylinder charge.

11. The method of claim 10, wherein the parameter associated with the mass-burn-fraction point for the cylinder charge comprises a crank angle associated with a 50% mass-burn-fraction point for the cylinder charge.

12. A multi-cylinder spark-ignition internal combustion engine, comprising
a monitored cylinder and a plurality of non-monitored cylinders;
a plurality of pistons disposed in the monitored cylinder and the non-monitored cylinders, the pistons coupled to a crankshaft;
a pressure sensor disposed to monitor in-cylinder pressure in the monitored cylinder;
a rotational position sensor disposed to monitor rotational position of the crankshaft;
a spark ignition system including a spark controller in communication with a plurality of spark igniters that are disposed in the monitored cylinder and the plurality of non-monitored cylinders;
a controller, in communication with the pressure sensor, the rotational position sensor and the spark controller, the controller including an instruction set executable to:
monitor, via the pressure sensor, in-cylinder pressure for the monitored cylinder during a combustion event for the monitored cylinder;
determine a first spark timing for the monitored cylinder based upon a desired spark timing and the in-cylinder pressure;
control, via the spark controller, spark timing for the monitored cylinder based upon the first spark timing;
monitor, via the rotational position sensor, engine rotational speed and crankshaft speed pulsations associated with the monitored cylinder and the non-monitored cylinders;
determine a modal coefficient for the non-monitored cylinders based upon the engine rotational speed and the crankshaft speed pulsations;
determine coefficient errors for the non-monitored cylinders based upon the modal coefficients;
execute a balance control to determine a spark timing adjustment for each of the non-monitored cylinders based upon the coefficient error;
determine final spark timings for the non-monitored cylinders based upon the desired spark timing and the respective spark timing adjustment; and
control, via the spark controller, spark timing for each of the non-monitored cylinders based upon the respective final spark timing.

13. The engine of claim 12, wherein the instruction set executes a principal component analysis to determine the modal coefficient for the non-monitored cylinders based upon the engine rotational speed and the crankshaft speed pulsations.

14. The engine of claim 12, wherein the instruction set is executable to determine a combustion parameter for the combustion event for the monitored cylinder based upon the in-cylinder pressure.

15. The engine of claim 12, wherein the instruction set executable to determine the first spark timing for the monitored cylinder based upon the desired spark timing and the in-cylinder pressure comprises the instruction set executable to:
determine a combustion parameter for the combustion event for the monitored cylinder based upon the in-cylinder pressure;
determine a first error term based upon the combustion parameter and a desired state for the combustion parameter;
determine a control point for the combustion parameter based upon the first error term;
determine the desired spark timing for the monitored cylinder based upon an engine operating point; and
determine the first spark timing for the monitored cylinder based upon the desired spark timing and the control point for the combustion parameter.

16. The engine of claim 12, wherein the instruction set is executable to determine a crank angle associated with a parameter associated with a mass-burn-fraction point for a cylinder charge.

17. The engine of claim 16, wherein the parameter associated with the mass-burn-fraction point for the cylinder charge comprises a crank angle associated with a 50% mass-burn-fraction point for the cylinder charge.

* * * * *